United States Patent
Ezura et al.

(10) Patent No.: US 7,061,656 B2
(45) Date of Patent: Jun. 13, 2006

(54) HOLOGRAM DUPLICATING DEVICE AND METHOD

(75) Inventors: Megumi Ezura, Tokyo (JP); Nobuhiro Kihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/468,307

(22) PCT Filed: Feb. 20, 2002

(86) PCT No.: PCT/JP02/01482

§ 371 (c)(1),
(2), (4) Date: Aug. 19, 2003

(87) PCT Pub. No.: WO02/067061

PCT Pub. Date: Aug. 29, 2002

(65) Prior Publication Data

US 2004/0070801 A1 Apr. 15, 2004

(30) Foreign Application Priority Data

Feb. 20, 2001 (JP) ............................. 2001-044057

(51) Int. Cl.
*G03H 1/20* (2006.01)
(52) U.S. Cl. ......................................... 359/12; 359/22
(58) Field of Classification Search .................. 359/9, 359/12, 22, 23; 362/31
See application file for complete search history.

(56) References Cited

U.S. PATENT DOCUMENTS

| 4,832,424 A | * | 5/1989 | McGrew | 359/8 |
| 5,016,953 A | * | 5/1991 | Moss et al. | 359/9 |
| 6,236,475 B1 | * | 5/2001 | Kihara et al. | 359/23 |

FOREIGN PATENT DOCUMENTS

| JP | 07-36357 | 2/1995 |
| JP | 07-134539 | 5/1995 |
| JP | 10-105034 | 4/1998 |
| JP | 2000-56663 | 2/2000 |
| JP | 2000-267552 | 9/2000 |
| JP | 2002-123162 | 4/2002 |

* cited by examiner

*Primary Examiner*—Mark A. Robinson
*Assistant Examiner*—Alessandro Amari
(74) *Attorney, Agent, or Firm*—Sonnenschein Nath & Rosenthal LLP

(57) ABSTRACT

A hologram duplicating apparatus (10) includes a first optical system (30) for carrying out exposure recording of holographic stereogram image on a recording medium for hologram to produce an original $H_1$, a second optical system (60) for carrying out exposure recording of image recorded on the original $H_1$ on a recording medium for hologram disposed at a predetermined distance from the original $H_1$ by using diffracted light obtained by illuminating the original $H_1$ to produce intermediate hologram $H_2$, and a third optical system (70) for carrying out exposure recording of image recorded on the intermediate hologram $H_2$ on a recording medium for hologram disposed at a predetermined distance from the intermediate hologram $H_2$ by using diffracted light obtained by illuminating the intermediate hologram $H_2$ to produce edge lit hologram $H_3$.

8 Claims, 11 Drawing Sheets

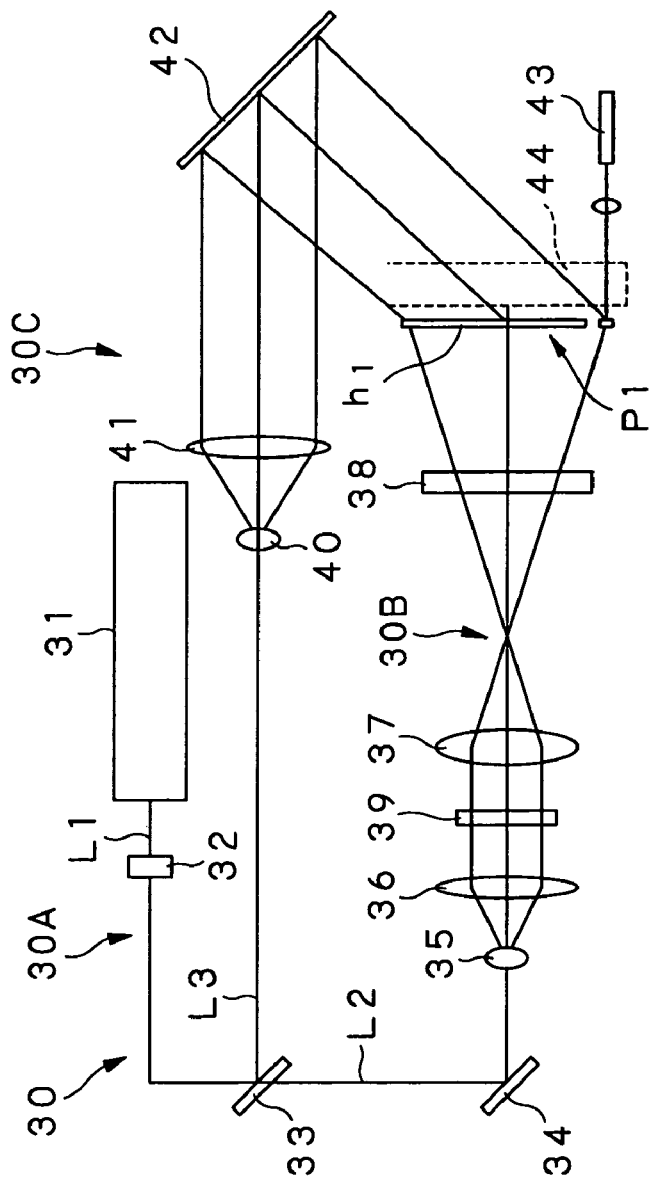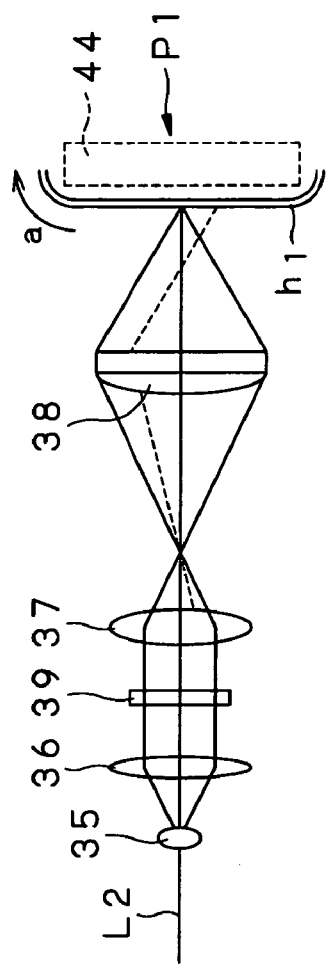
Fig.9A
Fig.9B

HOLOGRAM DUPLICATING DEVICE AND METHOD

BACKGROUND OF THE INVENTION

This invention relates to a hologram duplicating apparatus and a hologram duplicating method for duplicating hologram in which a holographic stereogram is used as the original, a hologram producing apparatus and a hologram producing method for producing hologram in which a holographic stereogram is used as the original, and an intermediate hologram producing apparatus and an intermediate hologram producing method for producing intermediate hologram used for duplication or production thereof.

Holographic stereograms are produced by allowing a large number of images obtained by successively imaging object from different observation points to be original image to successively expose and record such images as rectangular or dot-shaped element holograms on a single recording medium for hologram. In the case where this holographic stereogram is observed by an eye from a certain position, two-dimensional image which is a set of image information of a portion of respective element holograms is recognized, and in the case where this holographic stereogram is observed at another position horizontally shifted from this position, two-dimensional image which is a set of image information of another portion of respective element holograms is recognized. Accordingly, in the holographic stereogram, in the case where user observes this holographic stereogram by both eyes, exposed recording image is recognized as three-dimensional image by parallax of left and right eyes.

The above-described holographic stereogram is produced by a holographic stereogram producing apparatus 100 generally shown in FIG. 1A. The holographic stereogram producing apparatus 100 is constituted by a laser light source 101 for emitting coherent laser beam L10 of single wavelength, a half mirror 102 for dividing the emitted laser beam L10 into object light L11 and reference light L12, optical components 103 to 107 and an indicator 108 which constitute optical system of the object light L11, optical components 109 to 11 which constitute optical system of the reference light L12, and an electrically operated stage 113 for holding a recording medium 112 for hologram onto which object light L11 and reference light L12 are converged, and caused to undergo traveling drive.

Specifically, the optical system of object light L11 consists of a reflection mirror 103, a first cylindrical lens 104 for magnifying object light L11 in one-dimensional direction, a collimator lens 105 for changing the magnified object light L11 into parallel light, a projection lens 106, and a second cylindrical lens 107 for conducting object light L11 to the hologram recording medium 112 of an exposure recording unit P100 which are respectively arranged from the input side thereof along the optical axis. The indicator 108 is constituted by liquid crystal panel of the transmission type, and is disposed between the collimator lens 105 and the projection lens 106. On the indicator 108, image based on image data outputted from image processing unit (not shown) is displayed.

Specifically, the optical system of the reference light L12 consists of a cylindrical lens 109 for magnifying reference light L12 in one-dimensional direction, a collimator lens 110 for changing the magnified reference light L12 into parallel light, and a reflection mirror 111 for reflecting the reference light L12 to conduct it into the hologram recording medium 112 which are respectively arranged from the input side thereof along the optical axis.

The hologram recording medium 112 is constituted by, e.g., photosensitive film, and is held by the electrically operated stage 113 as shown in FIG. 1B. When this electrically operated stage 113 is driven, the hologram recording medium 112 is caused to intermittently undergo traveling drive in the direction indicated by the arrow b in the figure.

As shown in FIG. 1A, laser beam L10 is emitted from the laser light source 101 and is incident on the half mirror 102. Thus, the laser beam is divided into object light L11 and reference light L12 by this half mirror 102.

The object light L11 is incident on the indicator 108 through the cylindrical lens 104 and the collimator lens 105, and is caused to undergo image modulation in accordance with element image displayed when the object light L11 is transmitted through this indicator 108. The image-modulated object light L11 is incident on the hologram recording medium 112 positioned at the exposure recording unit P100 through the projection lens 106 and the cylindrical lens 107. Moreover, the reference light L12 is incident on the hologram recording medium 112 positioned at the exposure recording unit P100 through the optical system of the cylindrical lens 109, the collimator lens 110 and the reflection mirror 111.

Accordingly, interference fringes produced by interference of the object light L11 which has been image-modulated by image displayed on the indicator 108 and reference light L12 are successively exposed and recorded in rectangular or dot form as element holograms on the hologram recording medium 112. In this way, holographic stereogram is produced.

Meanwhile, in ordinary hologram, illumination light source for reproducing three-dimensional image and hologram are spatially separated. For this reason, ordinarily, broad space is required for reproduction, and the positional relationship between hologram and the illumination light source must be set to the determined condition in order to carry out reproduction in the optimum condition. This is similar also in the holographic stereogram consisting of plural element holograms.

On the contrary, if the illumination light source and hologram are integrated, space for illumination becomes unnecessary so that miniaturization can be realized. In addition, since the positional relationship between hologram and the illumination light source is constant at all times, reproduction can be carried out always in optimum condition. Further, as a hologram which realizes this, there is hologram of the so-called edge lit type which allows a recording medium to be in contact with all optically transparent light introduction block to carry out recording and/or reproduction.

When a transmission type edge lit hologram in which three-dimensional image is reproduced by light transmitted through a recording medium is produced, a recording medium 121 for hologram is attached to one surface 120a of a light introduction block 120 consisting of transparent material such as glass or plastic, etc. of suitable thickness as shown in FIG. 2. At this time, ordinarily, the hologram recording medium 121 is attached to the light introduction block 120 through index matching liquid (not shown) in order to prevent total reflection of light. Further, object light 124 from object 123 is irradiated toward the hologram recording medium 121 from the other surface 120b of the light introduction block 120, and reference light 125 is irradiated toward the hologram recording medium 121 from end surface 120c of the light introduction block 120. Thus, the transmission type edge lit hologram is produced.

Further, when the transmission type edge lit hologram produced in this way is reproduced, light introduction block such as glass, etc. was attached to the hologram recording medium to allow illumination light to be incident from the end surface of that light introduction block to thereby carry out reproduction of hologram. Specifically, as shown in FIG. 3, a hologram 131 is attached to one surface 130a of a light introduction block 130 through index matching liquid (not shown) thereafter to irradiate illumination light 133 for reproduction toward the hologram 131 from end surface 130b of the light introduction block 130. At this time, light transmitted through the hologram 131 is diffracted by the hologram 131. Further, reproduction image 135 takes place by this diffracted light 134. Thus, the reproduction image 135 is observed by an observer 136.

In the above-mentioned FIG. 3, the case where incident angle of reproduction illumination light of hologram is 60 degrees was indicated as an example. By introducing reproduction illumination light 133 through the light introduction block 130 in this way, it is possible to prevent surface reflection between hologram recording material and air. Since this effect becomes conspicuous particularly according as light incident angle of reproduction illumination light 133 becomes sharp, it is considered that the edge lit hologram is advantageous in realization of compact reproducing unit.

Meanwhile, since the edge lit hologram has various merits as previously described, there is high possibility that the edge lit hologram is utilized as a general image display apparatus. In this case, it is assumed that the necessity of duplicating a large number of holograms in which the same image information is recorded in the state where image quality is maintained takes place.

Hitherto, in the case of mass-producing duplications of holograms, the so-called one step method in which an original and photosensitive material for printing duplication are exposed in the state where they are caused to be in contact with each other was used as a general technique.

As one example of the one step method, the example where image of the original is duplicated and recorded on other recording medium for hologram in which a holographic stereogram is used as the original to produce edge lit hologram is shown in FIG. 4.

As shown in FIG. 4, in carrying out duplication and recording, a recording medium 141 for hologram for duplicating and recording image of the original is first attached to one surface 140a of a light introduction block 140. Then, an original 142 is attached to the hologram recording medium 141 attached on one surface 140a of the light introduction block 140 through index matching liquid.

In the state where the original is attached in this way, reference light 143 equivalent to illumination light for reproduction of the original 142 is caused to be incident into this light introduction block 140 from end surface 140b of the light introduction block 140.

The reference light 143 incident into the light introduction block 140 is transmitted through the hologram recording medium 141 and is incident on the original 142. The incident light is totally reflected by base film (not shown) of the original 142. Further, because of that the reference light 143 totally reflected by the base film is irradiated onto hologram recording material of the original 142, image recorded on this hologram recording material is reproduced.

Reproduction light of this original 142 is incident for a second time on the hologram recording material of the hologram recording medium 141 as object light. Further, the reproduction light of the original 142 incident as object light on the hologram recording material of this hologram recording medium 141 interferes with the reference light 143 incident into the light introduction block 140 within this hologram recording material. Thus, interference fringes of the reproduction light of the original 142 and the reference light 143 are recorded on the hologram recording material of the hologram recording medium 141, and image recorded on the original 142 is duplicated and recorded on the hologram recording medium.

In a manner as described above, by the 1 step method, image of the original is duplicated and recorded on other hologram recording medium in which the holographic stereogram is used as the original. Thus, edge lit hologram is produced.

However, the above-described 1 step method is suitable for duplication of hologram of the reflection type, but was not suitable for duplication of hologram in which image quality is maintained because there take place many factors which disturb image quality including double refraction at the surface of the contact portion of the light introduction block and the hologram recording material at the type where reproduction is carried out in the state in contact with the light introduction block like edge lit hologram.

As stated above, there also exist drawbacks in the 1 step method generally used. It can be said the technology for duplicating a large number of holograms using a holographic stereogram as the original is not yet established.

SUMMARY OF THE INVENTION

This invention has been proposed in view of such actual circumstances of prior arts, and an object of this invention is to provide a hologram duplicating apparatus and a hologram duplicating method for duplicating hologram in which a reflection type holographic stereogram is used as the original. Moreover, it is desired to provide a hologram producing apparatus and a hologram producing method for producing edge lit hologram without using the above-desired 1 step method. Further, it is desired to provide an intermediate hologram producing apparatus and an intermediate hologram producing method for producing intermediate hologram used for duplication or production of such hologram or edge lit hologram.

In order to attain the above-described objects, a hologram duplicating apparatus according to this invention is directed to a hologram duplicating apparatus for duplicating hologram in which a holographic stereogram is used as an original, and includes: a first optical system for allowing a first object light, which has been image-modulated on the basis of respective element images of parallax image sequence to be incident on one surface of a first hologram recording medium without diffusion, and for allowing a first reference light having coherence with the first object light to be incident on the other surface of the first hologram recording medium so as to successively carry out exposure recording of interference fringes produced by the first object light and the first reference light on the first hologram recording medium as element holograms, thereby producing the original; a second optical system for allowing a diffracted light obtained by irradiating a first reproduction light for reproducing image recorded on the original produced by the first optical system onto the original to be incident, as a second object light, on one surface of a second hologram recording medium disposed with a predetermined distance from the original, and for allowing a second reference light having coherence with the second object light to be incident on the other surface of the second hologram recording medium to carry out exposure recording of interference fringes produced by the second object light and the second reference light on the second hologram recording medium as hologram, thereby producing an intermediate hologram; and a third optical system in which an one-dimensional diffusion plate for diffusing incident light in one-dimensional direction is disposed at one surface of a third hologram recording medium disposed with a predetermined distance from the intermediate hologram produced by the second optical system in such a manner that the principal surface of the one-dimensional diffusion plate is in contact therewith, and for allowing a diffracted light obtained by irradiating a second reproduction light for reproducing image recorded on the intermediate hologram onto the intermediate hologram to be incident on one surface of a third hologram recording medium as a third object light through the one-dimensional diffusion plate and for allowing a third reference light having coherence with the third object light to be incident on the other surface of the third hologram recording medium to carry out exposure recording of interference fringes produced by the third object light and the third reference light on the third hologram recording medium as holograms, thereby producing a duplicated hologram.

Thus, hologram is duplicated using the holographic stereogram as the original.

Here, light introduction block consisting of transparent optical material may be attached on the surface of the third hologram recording medium where the third reference light is incident.

Thus, edge lit hologram is produced at the third optical system in the hologram duplicating apparatus.

Moreover, in order to attain the above-described objects, a hologram duplicating method according to this invention is directed to a hologram duplicating method of duplicating hologram in which a holographic stereogram is used as an original, and includes: a first exposure step of allowing a first object light, which has been image-modulated on the basis of respective element images of parallax image sequence to be incident on one surface of a first hologram recording medium without diffusion, and of allowing a first reference light having coherence with the first object light to be incident on the other surface of the first hologram recording medium so as to successively carry out exposure recording of interference fringes produced by the first object light and the first reference light on the first hologram recording medium as element holograms, thereby producing an original; a second exposure step of allowing a diffracted light obtained by irradiating a first reproduction light for reproducing image recorded on the original produced at the first exposure step onto the original to be incident, as a second object light, on one surface of a second hologram recording medium disposed with a predetermined distance from the original, and of allowing a second reference light having coherence with the second object light to be incident on the other surface of the second hologram recording medium to carry out exposure recording of interference fringes produced by the second object light and the second reference light on the second hologram recording medium as hologram, thereby producing an intermediate hologram; and a third exposure step in which an one-dimensional diffusion plate for diffusing incident light in one-dimensional direction is disposed at one surface of a third hologram recording medium disposed with a predetermined distance from the intermediate hologram produced at the second exposure step in such a manner that the principal surface of the one-dimensional diffusion plate is in contact therewith, the third exposure step of allowing a diffracted light obtained by irradiating a second reproduction light for reproducing image recorded on the intermediate hologram onto the intermediate hologram to be incident on one surface of the third hologram recording medium as a third object light through the one-dimensional diffusion plate, and of allowing a third reference light having coherence with the third object light to be incident on the other surface of the third hologram recording medium to carry out exposure recording of interference fringes produced by the third object light and the third reference light on the third hologram recording medium as holograms, thereby producing a duplicated hologram.

Thus, hologram is duplicated using holographic stereogram as the original.

Here, light introduction block consisting of transparent optical material may be attached to the surface where third reference light is incident in the third hologram recording medium.

Thus, edge lit hologram is produced at the third exposure step in the hologram duplicating method.

Further, a hologram producing apparatus according to this invention is directed to a hologram producing apparatus for producing hologram using an original holographic stereogram having the configuration in which plural element holograms are successively arranged along parallax direction, and includes intermediate hologram producing means for reproducing image of the original to carry out exposure recording of the reproduced image on a first hologram recording medium to thereby produce intermediate hologram, and hologram producing means for reproducing image of the intermediate hologram to carry out exposure recording of the reproduced image on a second hologram recording medium to thereby produce hologram, wherein the hologram producing means includes, at the surface of the second hologram recording medium, diffusing means for diffusing image reproduced from the intermediate hologram in a direction corresponding to a direction perpendicular to the parallax direction at the surface of the original.

Here, the intermediate hologram producing means and the hologram producing means may share a reproduction optical system for reproducing image and an exposure recording optical system for carrying out exposure recording of reproduced image.

Further, a hologram producing apparatus according to this invention is directed to a hologram producing apparatus for reproducing image using an original holographic stereogram having the configuration in which plural element holograms are successively arranged along parallax direction to produce hologram by using intermediate hologram produced by carrying out exposure recording of the reproduced image on a first hologram recording medium, and includes hologram producing means for reproducing image of the intermediate hologram to carry out exposure recording of the reproduced image on a second hologram recording medium to thereby produce hologram, wherein the hologram producing means includes, at the surface of the second hologram recording medium, diffusing means for diffusing image reproduced from the intermediate hologram in a direction corresponding to a direction perpendicular to the parallax direction at the surface of the original.

Further, a hologram producing apparatus according to this invention is directed to a hologram producing apparatus for reproducing image using an original holographic stereogram having the configuration in which plural element holograms are successively arranged along parallax direction to produce hologram by using intermediate hologram produced by carrying out exposure recording of the reproduced image on a first hologram recording medium, and includes hologram producing means for reproducing image of the intermediate hologram to carry out exposure recording of the reproduced image on a second hologram recording medium, wherein hologram produced by the hologram producing means is such that angle of visibility in a direction corresponding to a direction perpendicular to the parallax direction at the surface of the original is greater than angle of visibility of holographic stereogram of the original.

Here, these holograms produced at the hologram producing apparatus are, e.g., edge lit hologram.

Thus, it is possible to produce hologram, particularly edge lit holograms using a holographic stereogram as the original.

Further, a hologram producing method according to this invention is directed to a hologram producing method of producing hologram using an original holographic stereogram having the configuration in which plural element holograms are successively arranged in a parallax direction, and includes an intermediate hologram producing step of reproducing image of the original to carry out exposure recording of the reproduced image on a first hologram recording medium to thereby produce intermediate hologram, and a hologram producing step of reproducing image of the intermediate hologram to carry out exposure recording of the reproduced image on a second hologram recording medium to thereby produce hologram, wherein, at the hologram producing step, image reproduced from the intermediate hologram is diffused in a direction corresponding to a direction perpendicular to the parallax direction at the surface of the original by diffusing means disposed at the surface of the second hologram recording medium.

Here, at the intermediate hologram producing step and the hologram producing step, a reproduction optical system for reproducing image and an exposure recording optical system for carrying out exposure recording of the reproduced image may be shared.

Further, a hologram producing method according to this invention is directed to a hologram producing method of reproducing image using an original holographic stereogram having the configuration in which plural element holograms are successively arranged along parallax direction to produce hologram by using intermediate hologram produced by carrying out exposure recording of the reproduced image on a first hologram recording medium, and includes a hologram producing step of reproducing image of the intermediate hologram to carry out exposure recording of the reproduced image on a second hologram recording medium to thereby produce hologram, wherein, at the hologram producing step, image reproduced from the intermediate hologram is diffused in a direction corresponding to a direction perpendicular to the parallax direction at the surface of the original plate by diffusing means disposed at the surface of the second hologram recording medium.

Further, a hologram producing method according to this invention is directed to a hologram producing method of reproducing image using an original holographic stereogram having the configuration in which plural element holograms are successively arranged along parallax direction to produce hologram by using intermediate hologram produced by carrying out exposure recording of the reproduced image on a first hologram recording medium, and includes a hologram producing step of reproducing image of the intermediate hologram to carry out exposure recording of the reproduced image on a second hologram recording medium, wherein hologram produced at the hologram producing step is such that angle of visibility in a direction corresponding to a direction perpendicular to the parallax direction at the surface of the original is greater than angle of visibility of holographic stereogram of the original.

Here, these holograms produced by the hologram producing method are, e.g., edge lit hologram.

Thus, it is possible to produce hologram, particularly edge lit hologram using a holographic stereogram as the original.

Further, an intermediate hologram producing apparatus according to this invention is directed to an intermediate hologram producing apparatus for producing intermediate hologram used for producing hologram using an original holographic stereogram having the configuration in which plural element holograms are successively arranged along parallax direction, and includes intermediate hologram producing means for reproducing image of the original to carry out exposure recording of the reproduced image on a recording medium for hologram to thereby produce the intermediate hologram, wherein intermediate hologram produced by the intermediate hologram producing means is such that angle of visibility in a direction corresponding to a direction perpendicular to the parallax direction at the surface of the original is substantially the same as angle of visibility of holographic stereogram of the original.

Thus, intermediate hologram used when hologram, particularly edge lit hologram is produced using a holographic stereogram as the original is produced.

In addition, in order to attain the above-described objects, an intermediate hologram producing method according to this invention is directed to an intermediate hologram producing method of producing intermediate hologram used for producing hologram using an original holographic stereogram having the configuration in which plural element holograms are successively arranged along parallax direction, and includes an intermediate hologram producing step of reproducing image of the original to carry out exposure recording of the reproduced image on a recording medium for hologram, wherein intermediate hologram produced at the intermediate hologram producing step is such that angle of visibility in a direction corresponding to a direction perpendicular to the parallax direction at the surface of the original is substantially the same as angle of visibility of holographic stereogram of the original.

Thus, intermediate hologram used when hologram, particularly edge lit hologram is produced using a holographic stereogram as the original is produced.

Still further objects of this invention and more practical merits obtained by this invention will become more apparent from the description of the embodiment which will be given below.

BRIEF DESCRIPTION OF THE DRAWINGS

FIG. 9A is a front view showing a first optical system that holographic stereogram producing unit in the hologram duplicating apparatus has, and FIG. 9B is a plan view thereof.

DETAILED DESCRIPTION OF THE PRESENTLY PREFERRED EMBODIMENTS

More practical embodiment to which this invention is applied now will be described in detail with reference to the attached drawings.

Figures 1A, 1B:
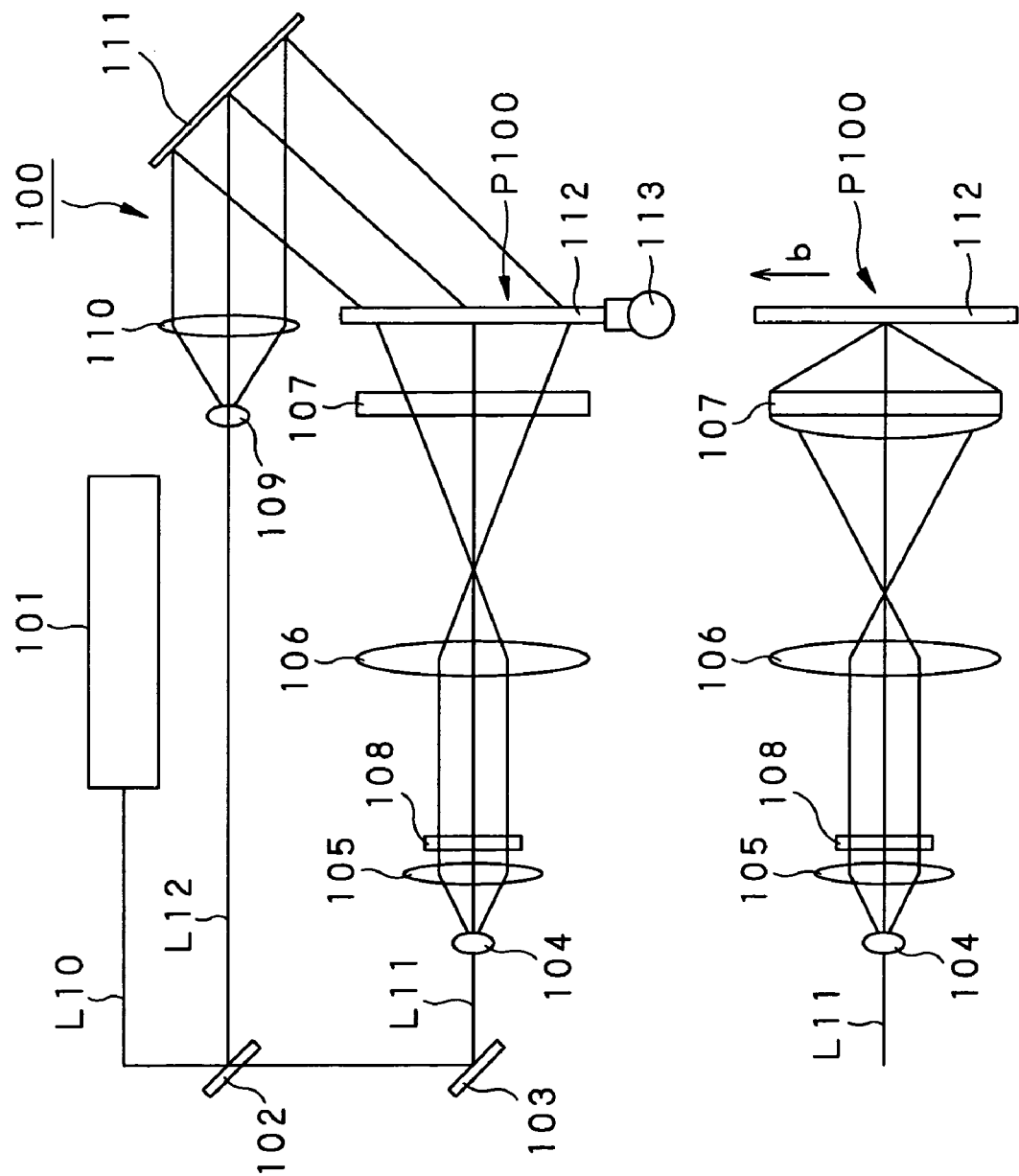
FIG. 1A is a front view showing optical system of a conventional holographic stereogram producing apparatus.
FIG. 1B is a plan view thereof.
Figure 2:
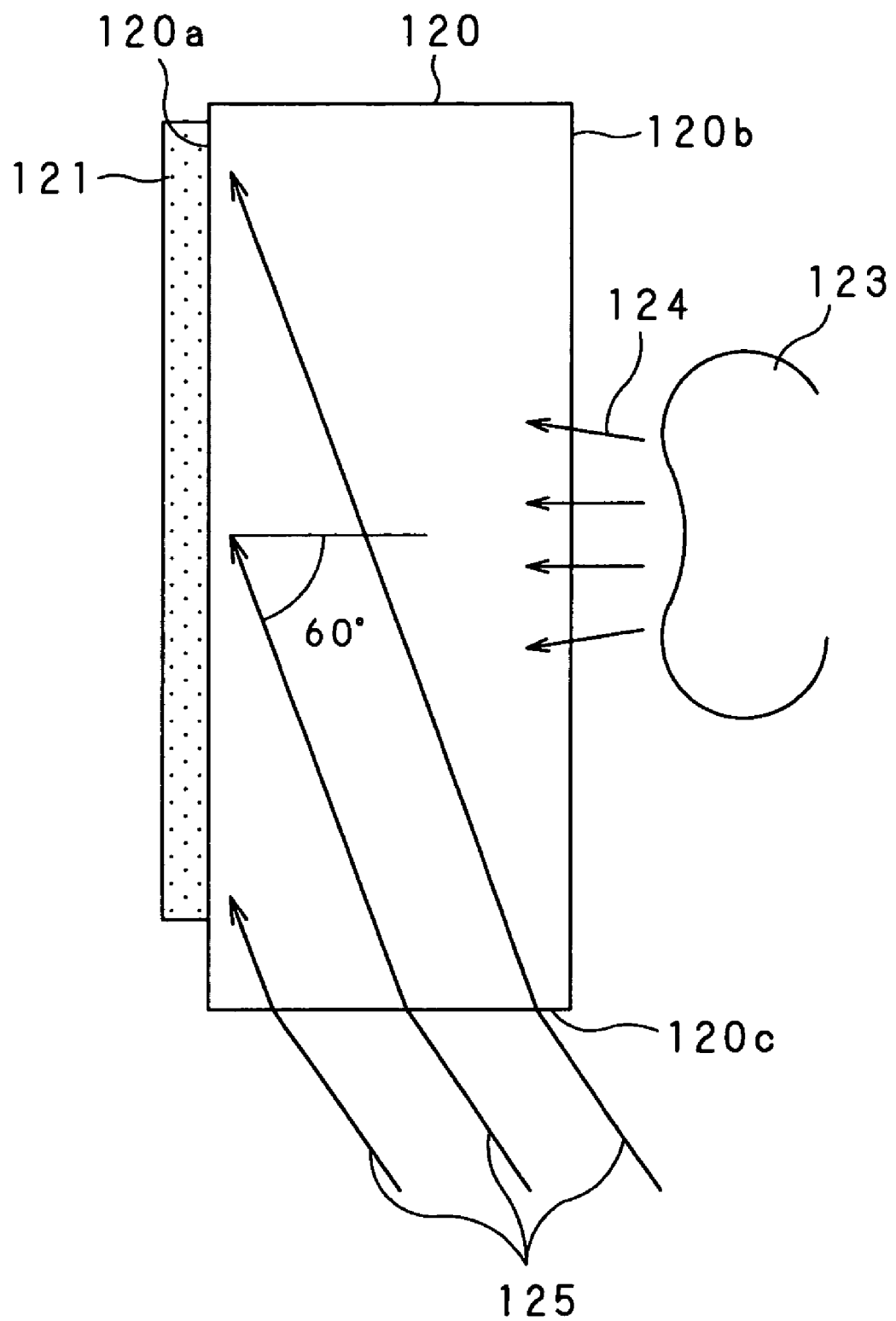
FIG. 2 is a view for explaining a conventional method of producing transmission type edge lit hologram.
Figure 3:
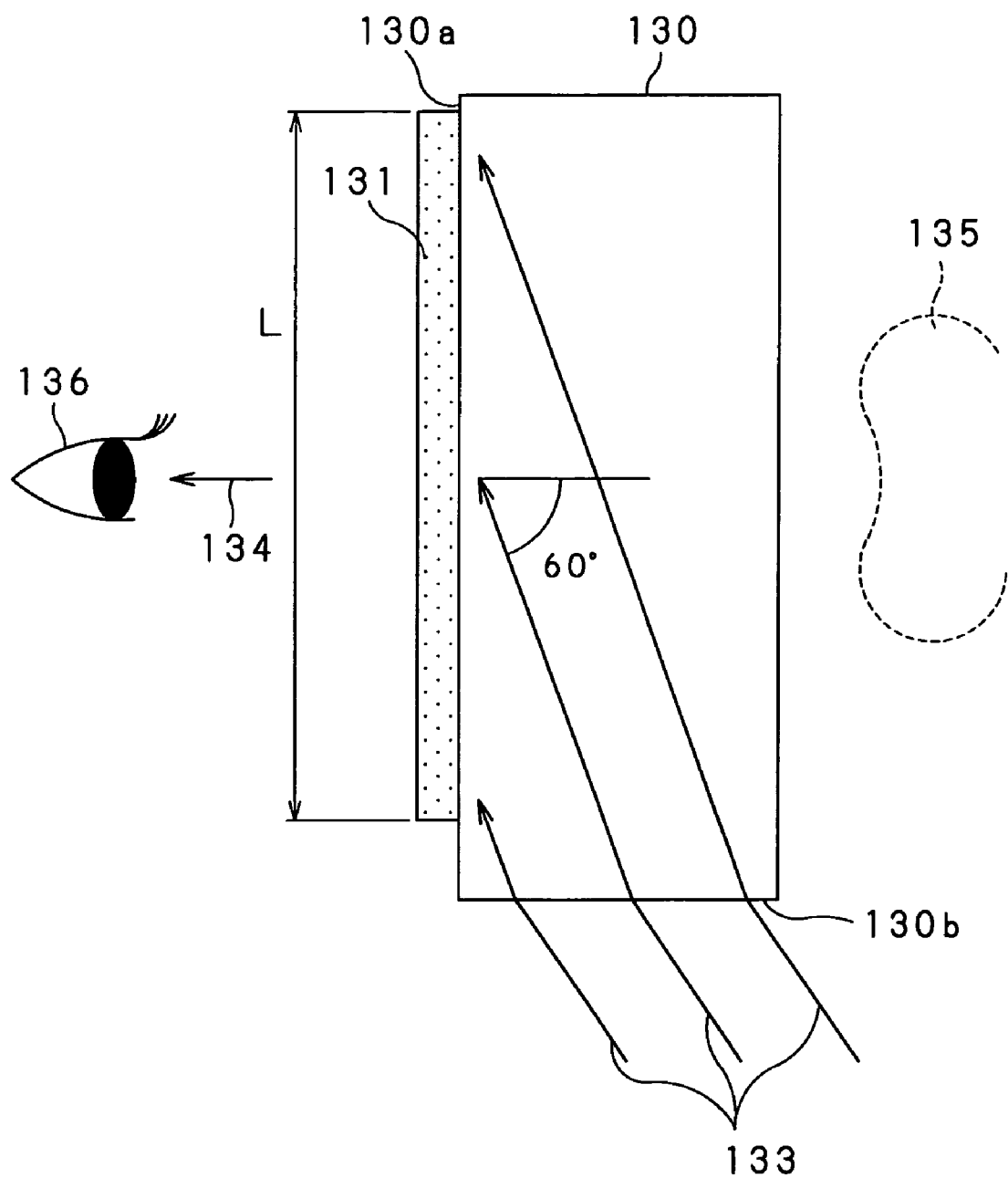
FIG. 3 is a view for explaining a conventional method of reproducing transmission type edge lit hologram.
Figure 4:
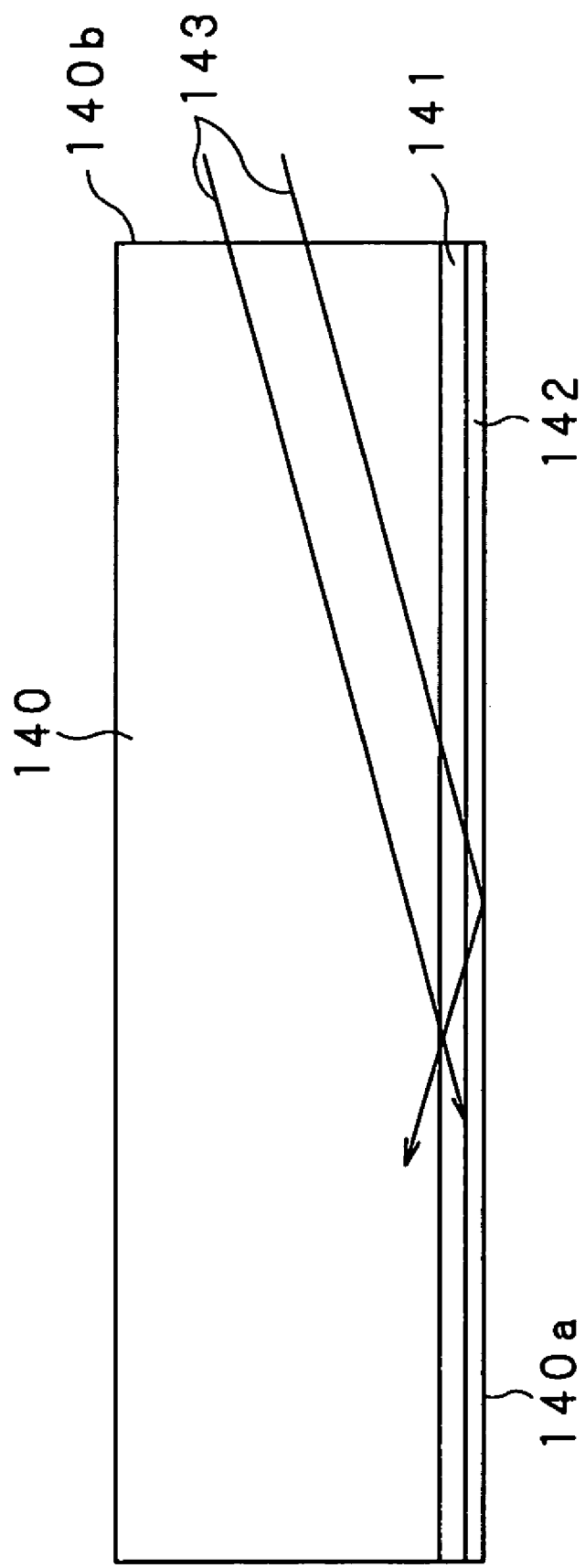
FIG. 4 is a view for explaining the principle of a conventional duplicating method for edge lit hologram by duplication recording of 1 step method.
Figure 5:
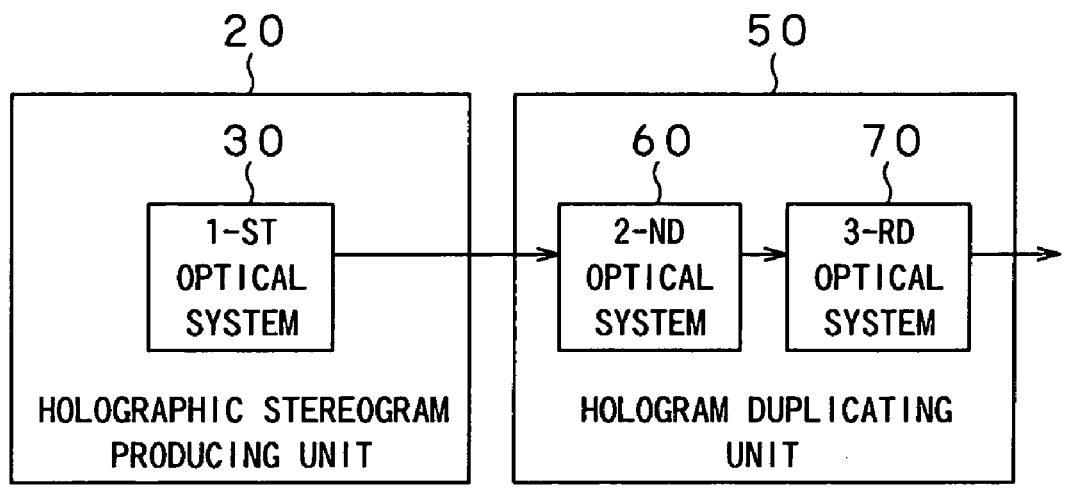
FIG. 5 is a block diagram for explaining outline of a hologram duplicating apparatus in this embodiment.

As shown in FIG. 5, this embodiment is directed to a hologram duplicating apparatus at least including a holographic stereogram producing unit 20 including a first optical system 30, and a hologram duplicating unit 50 including a second optical system 60 and a third optical system 70. At the holographic stereogram producing unit 20, interference fringes are successively exposed and recorded, e.g., in rectangular form as element holograms on a recording medium for hologram consisting of elongated photosensitive film to produce holographic stereogram serving as an original to produce the so-called edge lit hologram at the hologram duplicating unit 50 on the basis of this original.

Although described later, processing at the third optical system 70 is repeated, thereby making it possible to duplicate an arbitrary number of edge lit holograms.

First, prior to description of respective components, exposure recording principle on the hologram recording medium will be described.

Figure 6:
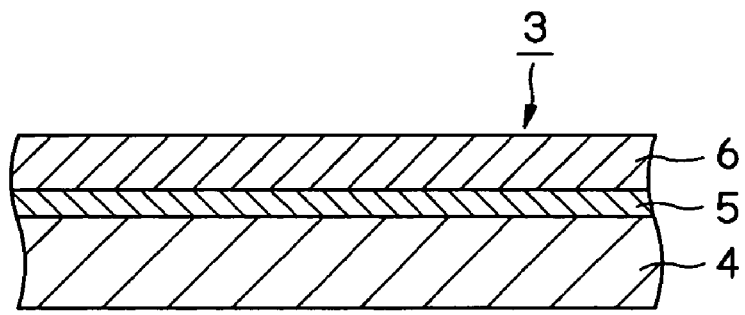
FIG. 6 is an essential part cross sectional view for explaining recording medium for hologram used in the hologram duplicating apparatus.

As shown in FIG. 6, a hologram recording medium 3 is the so-called film coating type recording medium in which a photo-polymer layer 5 consisting of photo-polymerization type photo-polymer is formed on a film base material 4, and a cover sheet layer 6 is adherently formed on this photo-polymer layer 5.

Figure 7A:
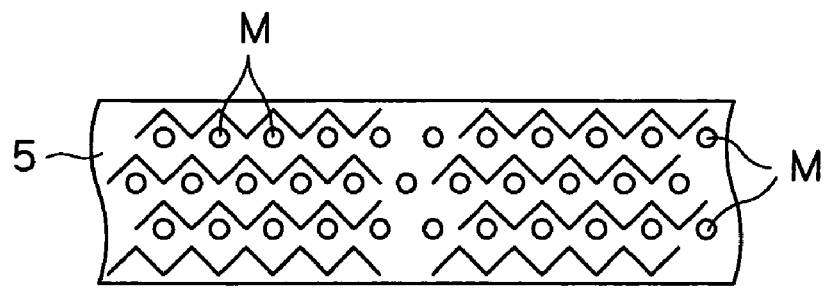
FIG. 7A is a view showing initial state of photosensitive process of the hologram recording medium.
Figure 7B:
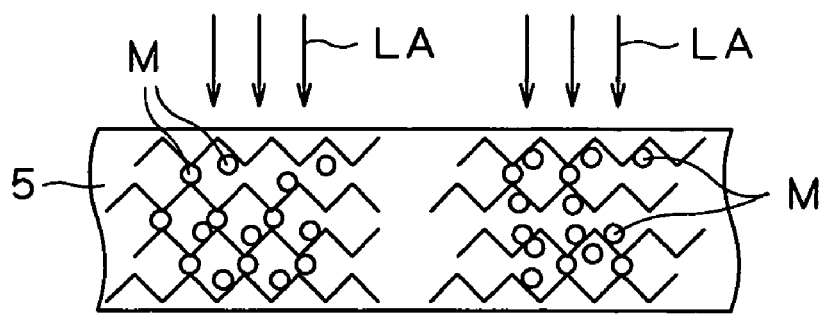
FIG. 7B is a view showing exposure state.

As shown in FIG. 7A, in such hologram recording medium 3, photo-polymerization type photo-polymer constituting the photo-polymer layer 5 is in the state where monomers M are uniformly diffused within matrix polymer in the initial state. Because of that laser beams LA having power of 10 mJ/cm$^2$ to 400 mJ/cm$^2$ are irradiated onto photo-polymerization type photo-polymer, monomers M which have been uniformly dispersed within matrix polymer at the exposure portion are polymerized as shown in FIG. 7B so that there results polymerization state.

Figure 7C:
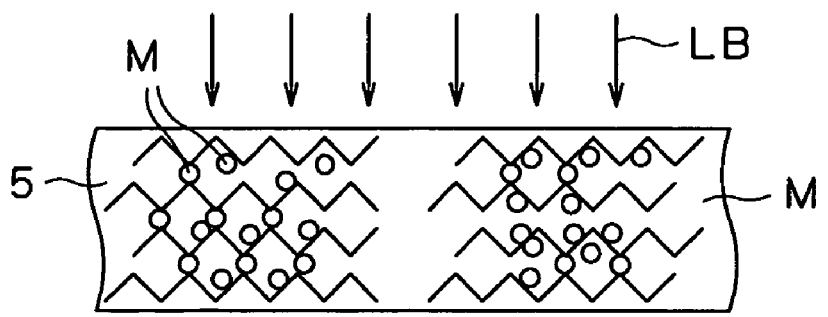
FIG. 7C is a view showing fixing state.

In the photo-polymerization photo-polymer, according as polymerization is advanced, because of unevenness of concentration of monomer M resulting from the fact that monomers M are moved from the periphery, there take place modulations of refractive index at the exposed portion and the non-exposed portion. Thereafter, in the photo-polymerization type photo-polymer, as shown in FIG. 7C, because of that ultraviolet ray or visible light LB having power of about 1000 mJ/cm$^2$ is irradiated onto the entire surface, polymerization of monomers M is completed within matrix polymer. In the hologram recording medium 3, because refractive index of the photo-polymerization type photo-polymer constituting the photo-polymer layer 5 as stated above changes in accordance with incident laser beam LA, interference fringes produced by interference between object light and reference light are caused to undergo exposure recording as change of refractive index.

The hologram duplicating apparatus uses the film coating type recording medium in which photo-polymer layer 5 is constituted by such photo-polymerization type photo-polymer as the hologram recording medium 3, whereby a step of implementing special development processing to the hologram recording medium 3 after exposure at the first optical system 30, the second optical system 60 and the third optical system 70 becomes unnecessary. Accordingly, the hologram duplicating apparatus can simplify its configuration because developing unit, etc. becomes unnecessary, and can quickly produce holographic stereogram. Thus, it is possible to quickly produce holograms using the holographic stereogram as the original.

Then, the overall configuration of the hologram duplicating apparatus will be described. The hologram duplicating apparatus carries out exposure recording of holographic stereogram image on the above-described hologram recording medium 3 to duplicate holograms using the holographic stereogram image as the original.

Figure 8:
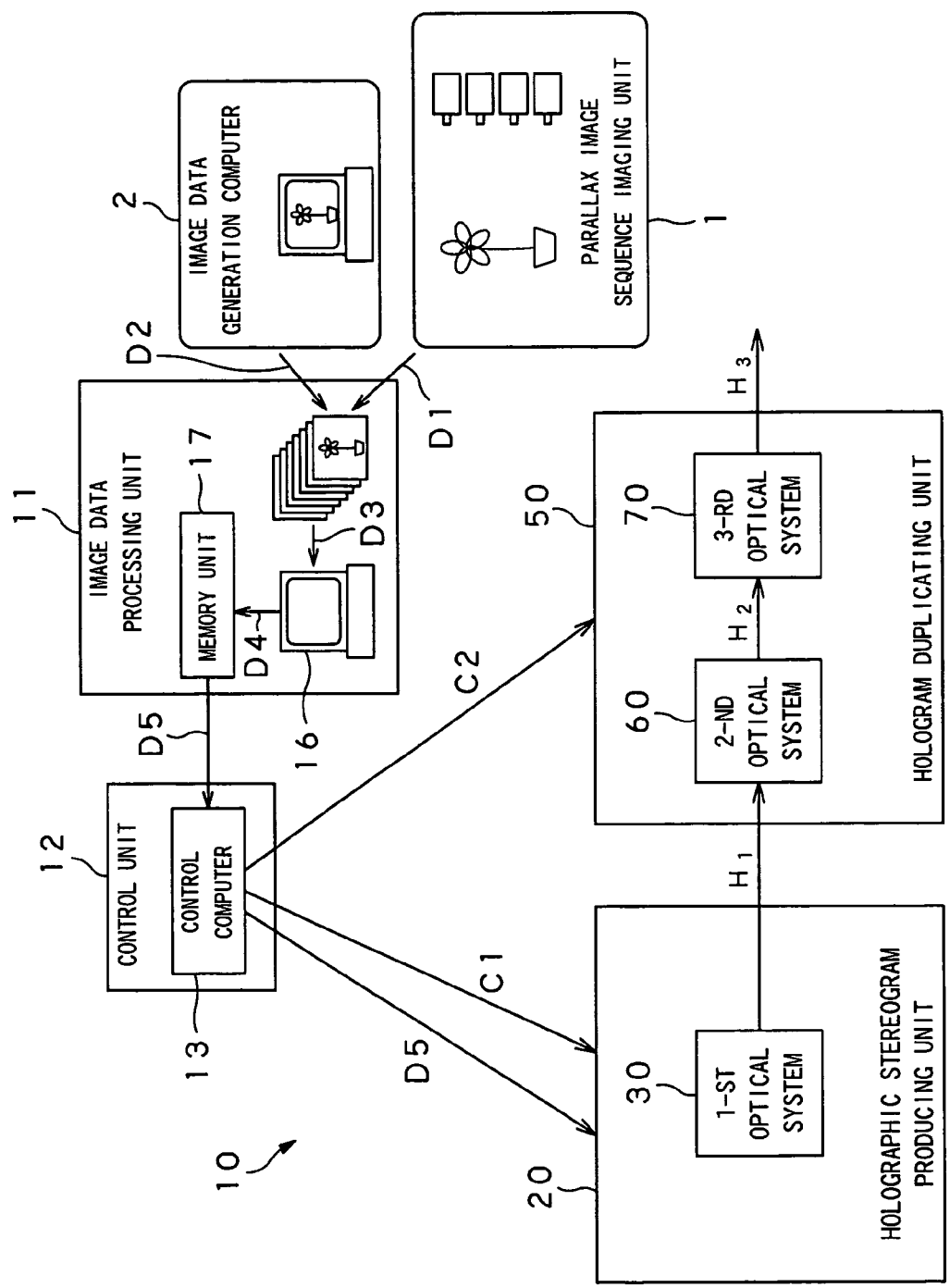
FIG. 8 is a view for explaining the configuration of the entirety of the hologram duplicating apparatus.

As shown in FIG. 8, the hologram duplicating apparatus 10 includes a image data processing unit 11 for carrying out processing of image data subject to exposure recording, a control unit 12 including a computer 13 for control for generally controlling this hologram duplicating apparatus 10, holographic stereogram producing unit 20 for producing holographic stereogram serving as an original H$_1$, and hologram duplicating unit 50 for duplicating hologram on the basis of holographic stereogram serving as the original H$_1$ produced at the holographic stereogram producing unit 20.

The image data processing unit 11 includes a computer 16 for image processing and a memory unit 17, and generates parallax image data sequence D3 on the basis of image data, such as, for example, imaging image data D1 including parallax information provided from a parallax image sequence imaging unit 1 including multiple-lens camera or movable camera, etc., or computer image data D2 including parallax information generated by a computer 2 for image data generation, etc.

It is to be noted that the imaging image data D1 is, e.g., plural image data obtained by simultaneous photographing by multiple-lens camera or continuous photographing by movable camera, and parallax information is included between respective image data constituting the imaging image data D1. In addition, computer image data D2 is, e.g., plural image data prepared as CAD (Computer Aided Design) or CG (Computer Graphics), and parallax information is included between respective image data constituting the computer image data D2.

The image data processing unit 11 implements a predetermined image processing for holographic stereogram to generate parallax image data sequence D3 based on these imaging image data D1 and/or computer image data D2 by the image processing computer 16 to generate hologram image data D4. The hologram image data D4 is temporarily stored with respect to the memory unit 17, e.g., memory or hard disc unit, etc. As described later, the image data processing unit 11 successively reads out element hologram image data D5 every one image from hologram image data D4 stored in the memory unit 17 when element hologram image is caused to undergo exposure recording on recording medium $h_1$ for hologram to provide these element hologram image data D5 to the control computer 13 in the control unit 12. Here, the hologram recording medium $h_1$ is medium which has the same quality as the previously described hologram recording medium 3, and is medium in which the hologram recording medium 3 is caused to be elongated.

The control computer 13 controls the holographic stereogram producing unit 20 to successively carry out exposure recording of element display images based on element hologram image data D5 provided from the image data processing unit 11 as rectangular element hologram on the hologram recording medium $h_1$ set at a portion of the holographic stereogram producing unit 20. In this instance, the control computer 13 controls operations of respective mechanisms of the holographic stereogram producing unit 20 and the hologram duplicating unit 50 as described later.

The holographic stereogram producing unit 20 includes the first optical system 30, and produces holographic stereogram serving as the original $H_1$ under control by the control computer 13.

The hologram duplicating unit 50 includes the second optical system 60 and the third optical system 70, and duplicates edge lit hologram $H_3$ by processing as described below using holographic stereogram produced at the holographic stereogram producing unit 20 as the original $H_1$.

The first optical system 30, the second optical system 60 and the third optical system 70 will be described below specifically in order.

The first optical system 30 includes, as shown in FIGS. 9A and 9B, an incident optical system 30A, an object optical system 30B and a reference optical system 30C. Among them, the object optical system 30B and the reference optical system 30C are constituted so that respective optical path lengths until exposure recording unit P1 of object light L2 and reference light L3 are caused to be substantially the same in order to enhance coherence of object light L2 and reference light L3. In this example, in the hologram duplicating apparatus 10, since recording medium $h_1$ for hologram serving as photosensitive material is used, the casing of the apparatus (not shown) including the first optical system 30, the second optical system 60 and the third optical system 70 has the structure in which light-shielding property of at least these optical systems is held.

The incident optical system 30A includes a laser light source 31 for emitting laser beam L1, a shutter mechanism 32 for allowing this laser beam L1 to be incident on the succeeding stage or cutting off it, and a half mirror 33 for dividing the laser beam L1 into object light L2 and reference light L3.

The laser light source 31 is a laser unit such as semiconductor excitation YAG laser unit, water-cooled argon ion laser unit or water-cooled krypton laser unit which emits coherent laser beam L1 of single wavelength, etc.

The shutter mechanism 32 is caused to undergo opening/closing operation by control signal C1 outputted from the control computer 13 in correspondence with output timing of element hologram image data D5 to allow laser beam L1 to be incident on hologram recording medium $h_1$ positioned at the exposure recording unit P1 through the optical system of the succeeding stage, or to cut off incidence on the hologram recording medium $h_1$ of laser beam L1.

The half mirror 33 divides incident laser beam L1 into transmitted light and reflected light. With respect to the laser beam L1, the transmitted light is used as the above-described object light L2, whereas the reflected light is used as reference light L3. These object light L2 and reference light L3 are respectively incident on the object optical system 30B and the reference optical system 30C provided at succeeding stages.

The object optical system 30B has the configuration in which optical parts such as a reflection mirror 34, a first cylindrical lens 35, a collimator lens 36, a projection lens 37 and a second cylindrical lens 38, etc. are arranged in order from the input side thereof along the optical axis.

The reflection mirror 34 totally reflects object light L2 transmitted through the half mirror 33. Object light L2 totally reflected by this reflection mirror 34 is provided to the first cylindrical lens 35.

The first cylindrical lens 35 has the configuration in which convex lens and pin hole are combined, and magnifies object light L2 totally reflected by the reflection mirror 34 in one-dimensional direction in correspondence with display surface width of transmission type liquid crystal indicator 39 which will be described later.

The collimator lens 36 changes the object light L2 magnified by the first cylindrical lens 35 into parallel light to conduct it to the transmission type liquid crystal indicator 39.

The projection lens 37 proejcts object light L2 onto the second cylindrical lens 38.

The second cylindrical lens 38 converges the object light L2 changed into parallel light with respect to lateral direction at the exposure recording unit P1.

Moreover, at the object optical system 30B, the transmission type liquid crystal indicator 39 is disposed in the state positioned between the collimator lens 36 and the projection lens 37. On the transmission type liquid crystal indicator 39, element hologram images are successively displayed on the basis of element hologram image data DS provided from the control computer 13. In this example, the control computer 13 provides control signal C1 to a recording medium sending mechanism 44 for elongated hologram recording medium $h_1$ which will be described later in correspondence with output timing of element hologram image data DS to carry out operation control thereof to control sending operation of the hologram recording medium $h_1$.

In such object optical system 30B, object light L2 in point light source state incident from the incident optical system 30A in a divided state is magnified by the first cylindrical lens 35, and is incident on the collimator lens 36 so that parallel light is provided. Further, in the object optical system 30B, object light L2 incident on the transmission type liquid crystal indicator 39 through the collimator lens 36 is image-modulated in accordance with element hologram image displayed on this transmission type liquid crystal indicator 39, and is incident on the second cylindrical lens 38 through the projection lens 37. Further, the object optical system 30B allows image-modulated object light L2 to be incident on hologram recording medium $h_1$ of the exposure recording unit P1 for a time period during which the shutter mechanism 32 is caused to undergo opening operation to carry out exposure recording thereof in correspondence with element hologram image. At this time, exposure recording is carried out by using direct light from the second cylindrical lens 38 without diffusing object light L2. The detail thereof will be described later.

The reference optical system 30C has the configuration in which a cylindrical lens 40, a collimator lens 41 and a reflection mirror 42 are successively arranged in order from the input side thereof along the optical axis.

The cylindrical lens 40 has the configuration in which convex lens and pin hole are combined similarly to the first cylindrical lens 35 in the above-described object optical system 30B, and magnifies, in one-dimensional direction, reference light L3 reflected and divided by the half mirror 33 in correspondence with a predetermined width, i.e., display surface width of the transmission type liquid crystal indicator 39 specifically.

The collimator lens 41 changes reference light L3 magnified by the cylindrical lens 40 into parallel light.

The reflection mirror 42 reflects reference light L3 to conduct reflected light toward backward direction of the hologram recording medium $h_1$ of the exposure recording unit P1 to allow it to be incident thereupon.

As described above, such first optical system 30 is constituted so that optical path lengths of the object optical system 30B which is an optical system through which object light L2 divided by the half mirror 33 is passed and the reference optical system 30C which is an optical system through which reference light L3 is passed are caused to be substantially the same. Accordingly, the first optical system 30 produces holographic stereogram in which coherence between object light L2 and reference light L3 is improved so that more clear reproduction image can be obtained.

Further, at the first optical system 30, there is provided, as occasion demands, an interference fringes detecting unit 43 for stopping exposure recording of hologram recording medium $h_1$ in the case where there takes place the possibility that holographic stereogram of satisfactory state is not produced by vibration, etc.

The interference fringes detecting unit 43 detects the state of interference fringes formed by object light L2 and reference light L3 which are respectively incident on the hologram recording medium $h_1$ through the above-described respective optical systems. The interference fringe detecting unit 43 is constituted by, e.g., CCD (Charge Coupled Device) camera, and detects fluctuation state of interference fringes formed in the detection area different from the exposure formation area of holographic stereogram at the hologram recording medium $h_1$ by wavelength order of laser beam L1 emitted from the laser light source 31.

When the interference fringes detecting unit 43 detects, within the detection area, appearance of interference fringes of fluctuation state more than a predetermined value, it provides detection signal to the control computer 13. The control computer 13 allows the shutter mechanism 32 to be inoperative state on the basis of this detection signal. Accordingly, in the hologram recording medium $h_1$, because incidence of object light L2 and reference light L3 is interrupted, production of holographic stereogram is stopped. Moreover, when interference fringes formed in the detection area are in fluctuation state within a predetermined value, the interference fringes detecting unit 43 stops delivery of detection signal with respect to the control computer 13. The control computer 13 allows the shutter mechanism 32 to be in operative state by this operation to cause object light L2 and reference light L3 to be incident on the hologram recording medium $h_1$ so that holographic stereogram can be produced.

Moreover, the holographic stereogram producing unit 20 including the first optical system 30 includes a recording medium sending mechanism 44 for carrying out intermittent sending of the hologram recording medium $h_1$ by one element hologram in a direction indicated by arrow a in FIG. 9B.

The recording medium sending mechanism 44 intermittently carries out traveling drive of hologram recording medium $h_1$ on the basis of control signal C1 provided from the control computer 13. In addition, the holographic stereogram producing unit 20 operates the above-described shutter mechanism 32 on the basis of control signal C1 provided from the control computer 13 in a manner interlocking with the operation of this recording medium sending mechanism 44 to release the optical path of laser beam L1.

The holographic stereogram producing unit 20 carries out traveling drive of the hologram recording medium $h_1$ along the traveling path by quantity corresponding to one element hologram because of that control signal C1 corresponding to one element hologram is provided from the control computer 13 in the control unit 12 to the recording medium sending mechanism 44 every completion of exposure recording corresponding to one element image to stop the hologram recording medium $h_1$ in the state where unexposed portion is caused to be in correspondence with the exposure recording unit P1. It is to be noted that the holographic stereogram producing unit 20 is constituted so that vibration produced in the hologram recording medium $h_1$ followed by traveling operation of the hologram recording medium $h_1$ is rapidly stopped. In this example, as described above, the hologram recording medium $h_1$ consists of elongated photosensitive film, and is wound on delivery roll rotatably provided within the film cartridge in which, e.g., the entirety is held in light shielding state although not shown. When this film cartridge is loaded into the holographic stereogram producing unit 20, the hologram recording medium $h_1$ is drawn out toward the inside of the holographic stereogram producing unit 20, and is caused to undergo traveling drive at the traveling path by the recording medium sending mechanism 44.

The holographic stereogram producing unit 20 allows object light L2 which has been image-modulated from surface and back thereof with respect to hologram recording medium $h_1$ because of that the shutter mechanism 32 is caused to undergo opening operation in this state and reference light L3 to be incident on the hologram recording medium $h_1$ at the exposure recording unit P1 to carry out exposure recording of interference fringes corresponding to element hologram image. The holographic stereogram producing unit 20 is adapted so that when exposure recording of one element image is completed, control signal C1 is provided from the control computer 13 at the control unit 12 to the recording medium sending mechanism 44 to allow the hologram recording medium $h_1$ to quickly undergo traveling drive by a predetermined quantity to stop it.

The holographic stereogram producing unit 20 carries out such operation in succession below to successively carry out exposure recording of plural holographic stereogram images on elongated hologram recording medium $h_1$ to produce holographic stereograms.

After exposure recording, a predetermined fixing processing is implemented to the holographic stereograms thus produced. To simply speak, at the fixing processing, ultraviolet ray LB having power of about 1000 mJ/cm$^2$ is irradiated to complete polymerization of monomers M in matrix polymer to increase refractive index modulation factor of that photo-polymer layer by heat treatment at about 120° C.

The holographic stereograms are cut out by cutter (not shown) every holographic stereogram image after fixing processing, and the holographic stereograms thus cut are used as the original $H_1$.

On the basis of the original $H_1$ produced in a manner as described above, at the hologram duplicating unit 50 including the second optical system 60 and the third optical system 70, edge lit hologram $H_3$ is finally duplicated through intermediate hologram $H_2$.

Figure 10:
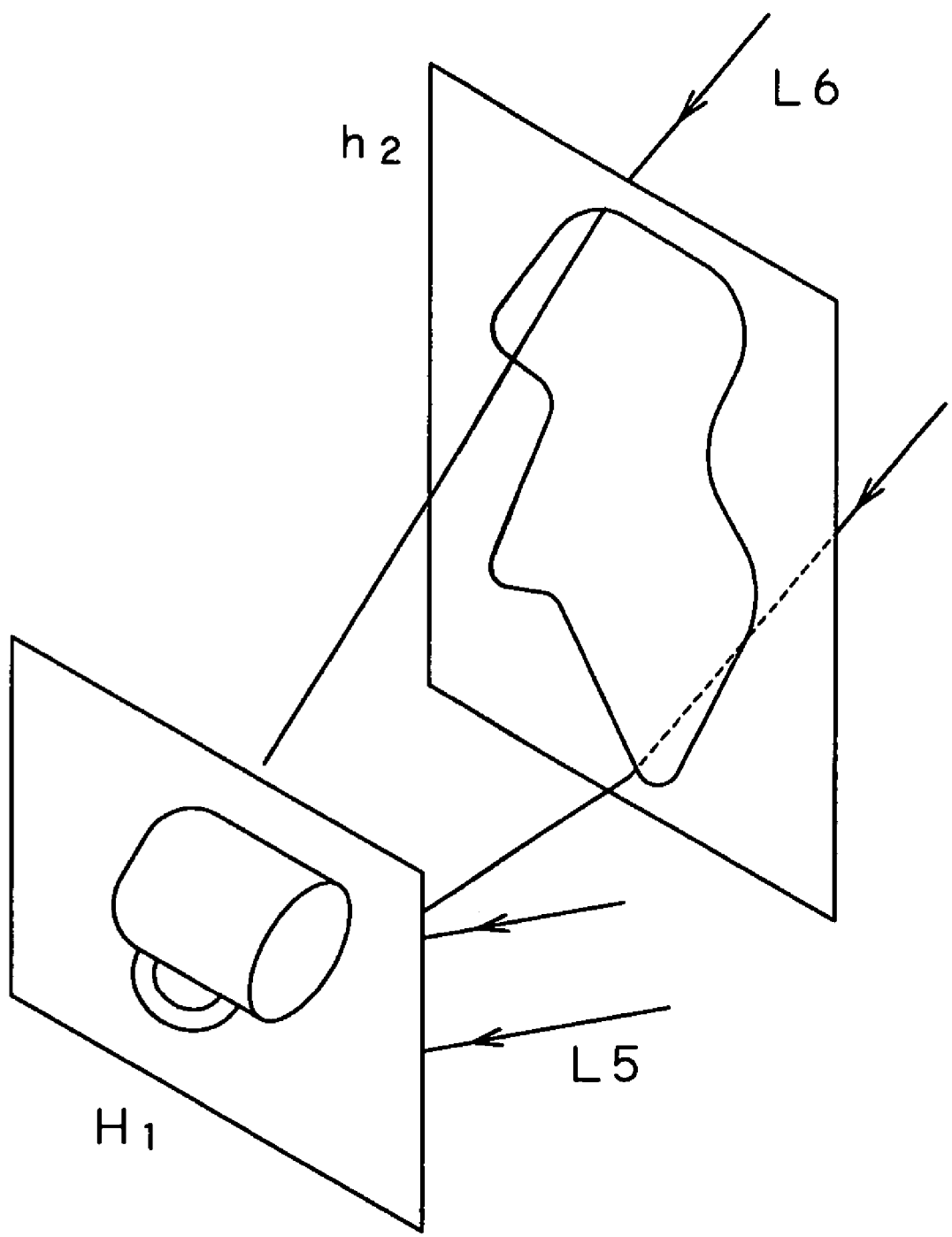
FIG. 10 is a view for explaining processing at a second optical system that hologram duplicating unit in the hologram duplicating apparatus has.

First, at the second optical system 60, as shown in FIG. 10, intermediate hologram $H_2$ is produced from the original $H_1$. Namely, reproduction light is irradiated onto the original $H_1$, and its diffracted light is irradiated as object light L5 onto an unrecorded recording medium $h_2$ for hologram placed at the position where image recorded on the original $H_1$ is formed. Reference light L6 is irradiated onto the hologram recording medium $h_2$ from the surface of the side opposite to the surface where object light L5 is irradiated, and interference fringes of the object light L5 and the reference light L6 are recorded onto the hologram recording medium $h_2$. This is used at third optical system 70 which will be described later as intermediate hologram $H_2$. Here, the hologram recording medium $h_2$ has the same quality as the hologram recording medium 3.

Figure 11:
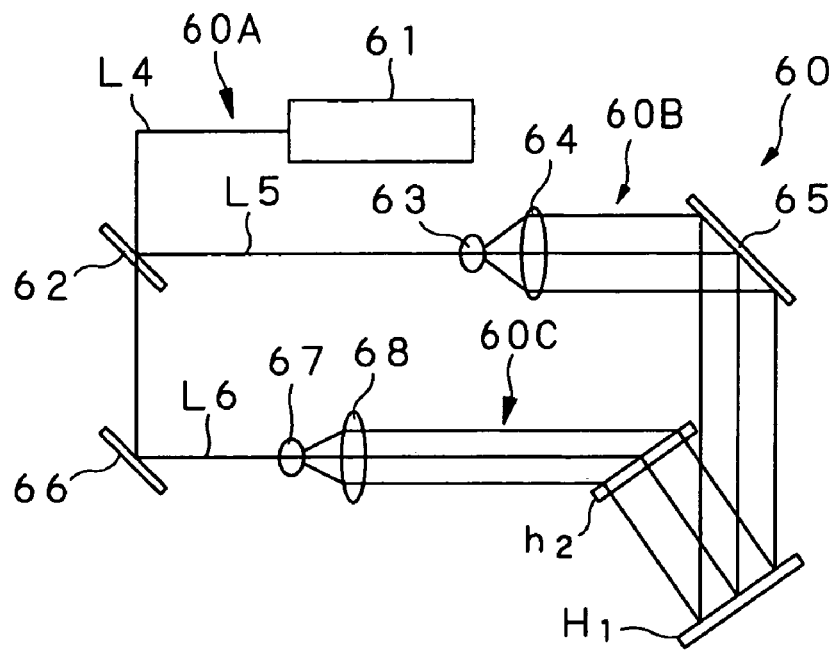
FIG. 11 is a view for explaining front view of the second optical system.

The configuration of the second optical system 60 is shown in FIG. 11. An incident optical system 60A includes a laser light source 61 for emitting laser beam L4, and a half mirror 62 for dividing this laser beam L4 into object light L5 and reference light L6.

The laser light source 61 is a laser unit, such as, for example, semiconductor excitation YAG laser unit, water-cooled argon ion laser unit or water-cooled krypton laser unit, etc. which emits coherent laser beam L4 of the single wavelength, etc.

Transmission to the succeeding stage of this laser beam L4 is controlled by shutter mechanism (not shown). Namely, the shutter mechanism is caused to undergo opening/closing operation by control signal C2 outputted from the control computer 13 to allow laser beam L4 to be incident on the original $H_1$ and hologram recording medium $h_2$ through the optical system of the succeeding stage, or to interrupt incidence on the original $H_1$ and the hologram recording medium $h_2$ of laser beam L4.

The half mirror 62 divides incident laser beam L4 into transmitted light and reflected light. With respect to laser beam L4, transmitted light is used as the above-described reference light L6, whereas reflected light is used as object light L5. The object light L5 and the reference light L6 are respectively incident on an object optical system 60B and a reference optical system 60C provided at the succeeding stages.

The object optical system 60B has the configuration in which optical parts such as a cylindrical lens 63, a collimator lens 64, and a reflection mirror 65, etc. are arranged in order from the input side thereof along the optical path.

The cylindrical lens 63 has the configuration in which convex lens and pin hole are combined, and magnifies object light L5 which is reflected light reflected by the half mirror 62 in one-dimensional direction.

The collimator lens 64 changes object light L5 magnified by the cylindrical lens 63 into parallel light.

The reflection mirror 65 reflects object light L5 to conduct the reflected light toward backward portion of the original $H_1$ produced at the first optical system 30 to allow it to be incident. Thus, image recorded on the original $H_1$ is reproduced at the position of the hologram recording medium $h_2$.

The reference optical system 60C has the configuration in which optical parts such as a reflection mirror 66, a cylindrical lens 67, and a collimator lens 68, etc. are arranged in order from the input side thereof along the optical axis.

The reflection mirror 66 totally reflects reference light L6 transmitted through the half mirror 62. Reference light L6 totally reflected by this reflection mirror 66 is provided to the cylindrical lens 67.

The cylindrical lens 67 has the configuration in which convex lens and pin hole are combined, and magnifies reference light L2 totally reflected by the reflection mirror 66 in one-dimensional direction.

The collimator lens 68 changes reference light L6 magnified by the cylindrical lens 67 into parallel light to conduct the parallel light to the backward portion of the hologram recording medium $h_2$ to allow it to be incident.

As described above, such second optical system 60 is constituted so that optical path lengths of the object optical system 60B which is an optical system through which object light L5 divided by the half mirror 62 is passed and the reference optical system 60C which is an optical system through which reference light L6 is passed are caused to be substantially the same. Accordingly, the second optical system 60 produces hologram in which coherence between object light L5 and reference light L6 is improved so that more clear reproduction image can be obtained.

By the configuration as described above, the second optical system 60 allows object light L5 and reference light L6 to interfere with each other at the inside of the hologram recording medium $h_2$ to cause interference fringes produced by interference to undergo exposure recording to produce intermediate hologram $H_2$. After exposure recording, similarly to the case of the first optical system 30, a predetermined fixing processing is implemented. The intermediate hologram $H_2$ produced in this way is used at the third optical system 70.

Figure 12:
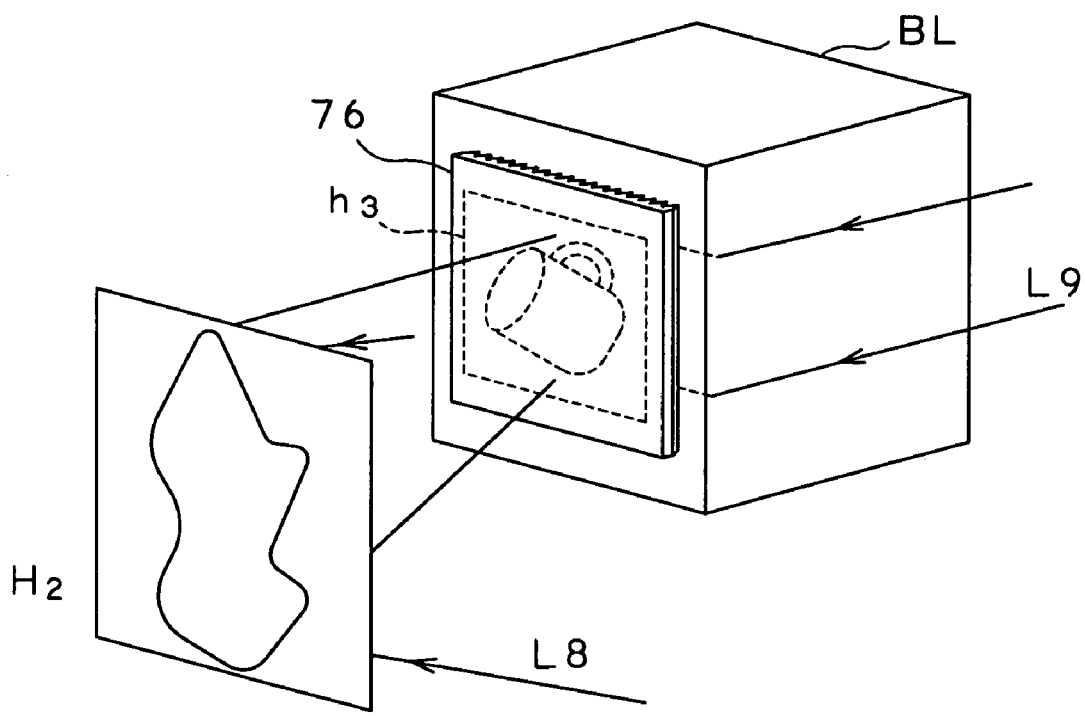
FIG. 12 is a view for explaining processing at a third optical system that the hologram duplicating unit has.

Then, the third optical system 70 will be described. At the third optical system 70, as shown in FIG. 12, edge lit hologram $H_3$ is produced from intermediate hologram $H_2$. Namely, reproduction light is irradiated onto the intermediate hologram $H_2$, and its diffracted light is irradiated, as object light L8, through an one-dimensional diffusion plate 76, onto recording medium $h_3$ for hologram placed at the distance where image recorded on the intermediate hologram $H_2$ is formed. A light introduction block BL consisting of transparent optical material such as glass or plastic, etc. of a suitable thickness is stuck onto the hologram recording medium $h_3$, and reference light L9 is irradiated from the side surface of the surface where object light L8 is irradiated. Interference fringes of the object light L8 and the reference light L9 are recorded onto the hologram recording medium $h_3$. Here, the hologram recording medium $h_3$ has the same quality as the hologram recording medium 3. Moreover, although not shown, the light introduction block BL is stuck onto the hologram recording medium $h_3$ through adhesive layer, e.g., index matching liquid, etc. having a refractive index such that the hologram recording medium $h_3$ and the light introduction block BL are not caused to undergo total reflection.

Here, the holographic stereogram maintains angle of visibility in parallax direction because of that plural element holograms are arranged in one direction, but sacrifices parallax with respect to the direction perpendicular thereto. Namely, in the holographic stereogram, sufficient angle of visibility can be maintained in parallax direction, but angle of visibility cannot be maintained in a perpendicular direction. For this reason, it is necessary to use an one-dimensional diffusion plate for the object optical system to compensate angle of visibility in that direction.

However, when one-dimensional diffusion plate is used at the first optical system 30 or the second optical system 60, recording medium h for hologram which is photosensitive material must be enlarged in order to record diffused diffracted light in exposure of the next stage. As a result, it is difficult that the optical system becomes compact. In addition, rigorous precision is required for plane characteristic or angle with respect to optical axis of photosensitive material, etc. Particularly, when one-dimensional diffusion plate is used at the first optical system 30, brightness is lowered by diffusion of object light, and degradation in image quality thereafter becomes conspicuous.

In view of the above, in the hologram duplicating apparatus 10 in this embodiment, the above-described one-dimensional diffusion plate 76 is disposed as shown in FIG. 12 immediately before recording medium $h_3$ for hologram at the third optical system 70 without using the one-dimensional diffusion plate at the first optical system 30 to maintain angle of visibility in a direction perpendicular to parallax direction.

Figure 13:
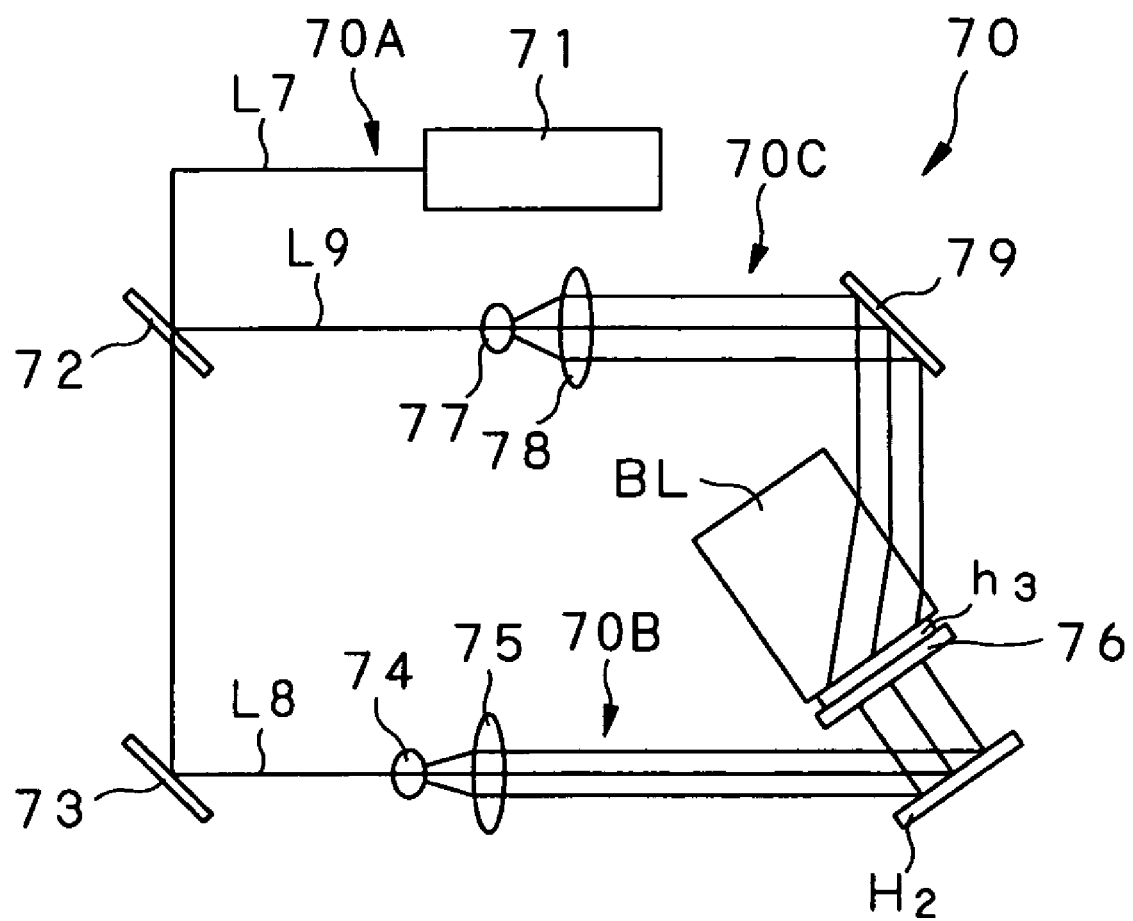
FIG. 13 is a view for explaining front view of the third optical system.

The configuration of the third optical system 70 is shown in FIG. 13. An incident optical system 70A includes a laser light source 71 for emitting laser beam L7, and a half mirror 72 for dividing this laser light L7 into object light L8 and reference light L9.

The laser light source 71 is a laser unit, e.g., semiconductor excitation YAG laser unit, water-cooled argon ion laser unit or water-cooled krypton unit which emits coherent laser beam L7 of single wavelength, etc.

Transmission to the succeeding stage of this laser beam L7 is controlled by shutter mechanism (not shown). Namely, the shutter mechanism is caused to undergo opening/closing operation by control signal C2 outputted from the control computer 13 to allow laser beam L7 to be incident on intermediate hologram $H_2$ and hologram recording medium $h_3$ through the optical system of the succeeding stage, or to interrupt incidence on intermediate hologram $H_2$ and hologram recording medium $h_3$ of laser beam L7.

The half mirror 72 divides incident laser beam L7 into transmitted light and reflected light. With respect to the laser beam L7, transmitted light is used as the above-described object light L8, whereas reflected light is used as reference light L9. The object light L8 and the reference light L9 are respectively incident on an object optical system 70B and a reference optical system 70C provided at the succeeding stages.

The object optical system 70B has the configuration in which optical parts such as a reflection mirror 73, a cylindrical lens 74, a collimator lens 75, and one-dimensional diffusion plate 76, etc. are arranged in order from the input side thereof along the optical axis.

The reflection mirror 73 totally reflects object light L8 transmitted through the half mirror 72. The object light L8 totally reflected by this reflection mirror 73 is provided to the cylindrical lens 74.

The cylindrical lens 74 has the configuration in which convex lens and pin hole are combined, and magnifies object light L8 totally reflected by the reflection mirror 73 in one-dimensional direction.

The collimator lens 75 changes object light L1 magnified by the cylindrical lens 74 into parallel light to irradiate the parallel light onto intermediate hologram $H_2$, and its diffracted light is incident on the one-dimensional diffusion plate 76.

The one-dimensional diffusion plate 76 diffuses object light L1 in one-dimensional direction as described above to allow the object light L1 to be incident on hologram recording medium $h_3$.

The reference optical system 70C has the configuration in which a cylindrical lens 77, a collimator lens 78 and a reflection mirror 79 are arranged in order from the input side thereof along the optical axis.

The cylindrical lens 77 has the configuration in which convex lens and pin hole are combined similarly to the cylindrical lens 74 in the above-described object optical system 70B, and magnifies reference light L9 reflected and divided by the half mirror 72 in one-dimensional direction in correspondence with a predetermined width.

The collimator lens 78 changes reference light L9 magnified by the cylindrical lens 77 into parallel light.

The reflection mirror 79 reflects reference light L9 to conduct the reflected light to the side surface of the light introduction block BL of the hologram recording medium $h_3$ to allow it to be incident. The reference light L9 incident on the side surface of the light introduction block BL is incident on the backward portion of the hologram recording medium $h_3$.

As described above, such third optical system 70 is constituted so that optical path lengths of the object optical system 70B which is an optical system through which object light L8 divided by the half mirror 72 is passed and the reference optical system 70C which is an optical system through which reference light L9 is passed are caused to be substantially the same. Accordingly, the third optical system 70 produces edge lit hologram $H_3$ in which coherence between object light L8 and reference light L9 is improved so that more clear reproduction image can be obtained.

By the configuration as described above, the third optical system 70 allows object light L8 and reference light L9 to interfere with each other at the inside of hologram recording medium $h_3$ to cause interference fringes produced by interference to undergo exposure recording to produce edge lit hologram $H_3$. After exposure recording, similarly to the case of the first optical system 30, a predetermined fixing processing is implemented. In addition, by repeating the operation in the above-described third optical system 70, it is possible to extensively duplicate an arbitrary number of edge lit holograms $H_3$ on the basis of the original As stated above, the hologram duplicating apparatus 10 in this embodiment can be constituted by making improvements on the basis of existing holographic stereogram producing system, and can duplicate holograms in which brightness is maintained and angle of visibility is maintained.

Particularly, edge lit hologram $H_3$ duplicated by this hologram duplicating apparatus 10 has merits such that since transmitted light which does not contribute to reproduction is confined within light introduction block BL by total reflection so that it does not leak toward the outside, guide wave is efficiently carried out so that bright image is reproduced, and since angle of reproduction is great, image is difficult to be reproduced by light entered from the outside of the light introduction block BL except for reproduction light.

Moreover, the edge lit type is employed, thereby making it possible to include the light source within the light introduction block BL. Thus, it is also possible to maintain brightness irrespective of illumination environment.

It is to be noted that this invention is not limited only to the above-described embodiment, but it is a matter of course that various changes can be made within the scope which does not depart from the gist of this invention.

While, e.g., edge lit holograms are duplicated from holographic stereogram serving as an original in the above-described embodiment, this invention is not limited to this implementation, but it is sufficient to duplicate ordinary holograms.

Further, while it has been described that holographic stereogram producing unit 20 and hologram duplicating unit 50 are provided in single hologram duplicating apparatus 10, it is sufficient that both units are separate units, and holograms may be duplicated using the already produced holographic stereogram as the original.

Further, the second optical system 60 and the third optical system 70 included in the hologram duplicating unit 50 may be constituted as separate units. Furthermore, the second optical system 60 and the third optical system 70 may also have the configuration in which both systems share a partial optical system such as reproduction optical system for reproducing image or exposure recording optical system for carrying out exposure recording of reproduced image to first produce intermediate hologram $H_2$ thereafter to produce edge lit hologram $H_3$.

In addition, there may be employed a configuration to produce intermediate hologram $H_2$ by separate unit to produce edge lit hologram $H_3$ by using this intermediate hologram $H_2$.

INDUSTRIAL APPLICABILITY

By using this invention as described above, it becomes possible to duplicate or produce a large quantity of holograms or edge lit holograms without lowering image quality in the state where holographic stereogram is used as the original.

The invention claimed is:

1. A hologram duplicating apparatus adapted for duplicating a hologram in which a holographic stereogram is used as an original, the hologram duplicating apparatus comprising:
    a first optical system for allowing a first object light, which has been image-modulated on the basis of respective element images of a parallax image sequence to be incident on a first surface of a first hologram recording medium without diffusion, and for allowing a first reference light having coherence with the first object light to be incident on an opposite surface of the first hologram recording medium so as to successively carry out exposure recording of interference fringes produced by the first object light and the first reference light on the first hologram recording medium as element holograms, thereby producing the original;
    a second optical system for allowing a diffracted light obtained by irradiating a first reproduction light onto the original for reproducing the original to be incident as a second object light on a first surface of a second hologram recording medium disposed with a predetermined distance from the original, and for allowing a second reference light having coherence with the second object light to be incident on an opposite surface of the second hologram recording medium to carry out exposure recording of interference fringes produced by the second object light and the second reference light on the second hologram recording medium as holograms, thereby producing an intermediate hologram; and
    a third optical system in which a one-dimensional diffusion plate for diffusing incident light in a one-dimensional direction is disposed at a first surface of a third hologram recording medium disposed with a predetermined distance from the intermediate hologram produced by the second optical system in such a manner that the principal surface thereof is in contact therewith, the third optical system for allowing a diffracted light obtained by irradiating a second reproduction light onto the intermediate hologram for reproducing the intermediate hologram to be incident on the first surface of the third hologram recording medium as a third object light through the one-dimensional diffusion plate, and for allowing a third reference light having coherence with the third object light to be incident on an opposite other surface of the third hologram recording medium to carry out exposure recording of interference fringes produced by the third object light and the third reference on the third hologram recording medium as holograms, thereby producing a duplicated hologram.

2. The hologram duplicating apparatus as set forth in claim 1, wherein a light introduction block consisting of transparent optical material is attached on the opposite surface of the third hologram recording medium where the third reference light is incident.

3. A hologram duplicating method of duplicating hologram in which a holographic stereogram is used as an original, the hologram duplicating method including:
    a first exposure step of allowing a first object light, which has been image-modulated on the basis of respective element images of parallax image sequence to be incident on a first surface of a first hologram recording medium without diffusion, and of allowing a first reference light having coherence with the first object light to be incident on an opposite surface of the first hologram recording medium so as to successively carry out exposure recording of interference fringes produced by the first object light and the first reference light on the first hologram recording medium as element holograms, thereby producing the original;
    a second exposure step of allowing a diffracted light obtained by irradiating a first reproduction light onto the original for reproducing the original to be incident as a second object light on a first surface of a second hologram recording medium disposed with a predetermined distance from the original, and of allowing a second reference light having coherence with the second object light to be incident on an opposite surface of the second hologram recording medium to carry out exposure recording of interference fringes produced by the second object light and the second reference light on the second hologram recording medium as hologram, thereby producing an intermediate hologram; and
    a third exposure step in which a one-dimensional diffusion plate for diffusing incident light in one-dimensional direction is disposed at a first surface of a third hologram recording medium disposed with a predetermined distance from the intermediate hologram produced at the second exposure step in such a manner that the principal surface thereof is in contact therewith, the third exposure step of allowing a diffracted light obtained by irradiating a second reproduction light onto the intermediate hologram for reproducing the intermediate hologram to be incident on the first surface of the third hologram recording medium as a third object light through the one-dimensional diffusion plate, and of allowing a third reference light having coherence with the third object light to be incident on an opposite other surface of the third hologram recording medium to carry out exposure recording of interference fringes produced by the third object light and the third reference light on the third hologram recording medium as holograms, thereby producing a duplicated hologram.

4. The hologram duplicating method as set forth in claim 3, wherein a light introduction block consisting of transparent optical material is attached on the opposite surface of the third hologram recording medium where the third reference light is incident.

5. A hologram producing apparatus adapted for producing a hologram using an original holographic stereogram having the configuration in which plural element holograms are successively arranged along a parallax direction, the hologram producing apparatus comprising:
   intermediate hologram producing means for reproducing an image of the original holographic stereogram to carry out exposure recording of a reproduced image of the original holographic stereogram on a first hologram recording medium to thereby produce an intermediate hologram; and
   hologram producing means for reproducing an image of the intermediate hologram to carry out exposure recording of a reproduced image of the intermediate hologram on a second hologram recording medium to thereby produce the hologram,
   wherein the hologram producing means comprises, at the surface of the second hologram recording medium, diffusing means for diffusing the reproduced image of the intermediate hologram in a direction corresponding to a direction perpendicular to the parallax direction at the original holographic stereogram.

6. The hologram producing apparatus as set forth in claim 5, wherein the intermediate hologram producing means and the hologram producing means share a reproduction optical system for reproducing the image of the original holographic stereogram and the image of the intermediate hologram and an exposure recording optical system for carrying out exposure recording of the reproduced image of the original holographic stereogram and the reproduced image of the intermediate hologram.

7. A hologram producing apparatus adapted for reproducing an image using an original holographic stereogram having the configuration in which plural element holograms are successively arranged along a parallax direction to produce a hologram by using an intermediate hologram produced by carrying out exposure recording of a reproduced image on a first hologram recording medium, the hologram producing apparatus comprising:
   hologram producing means for reproducing an image of the intermediate hologram to carry out exposure recording of the reproduced image of the intermediate hologram on a second hologram recording medium to thereby produce the hologram,
   wherein the hologram producing means comprises, at a surface of the second hologram recording medium, diffusing means for diffusing the reproduced image of the intermediate hologram in a direction corresponding to a direction perpendicular to the parallax direction at a surface of the original.

8. A hologram producing method of producing a hologram using an original holographic stereogram having the configuration in which plural element holograms are successively arranged along a parallax direction, the hologram producing method including:
   an intermediate hologram producing step of reproducing an image of the original holographic stereogram to carry out exposure recording of the reproduced image of the original holographic stereogram on a first hologram recording medium to thereby produce an intermediate hologram; and
   a hologram producing step of reproducing an image of the intermediate hologram to carry out exposure recording of the reproduced image of the intermediate hologram on a second hologram recording medium to thereby produce the hologram,
   wherein, at the hologram producing step, the image of the intermediate hologram that is reproduced to produce the hologram is diffused by diffusing means disposed on a surface of the second hologram recording medium in a direction corresponding to a direction perpendicular to the parallax direction at a surface of the original holographic stereogram,
   wherein, at the intermediate hologram producing step and the hologram producing step, a reproduction optical system for reproducing the image of the original holographic stereogram and the image of the intermediate hologram and an exposure recording optical system for carrying out exposure recording of the reproduced image of the original holographic stereogram and the reproduced image of the intermediate hologram are shared.

* * * * *